June 4, 1957         C. L. JOHNSON         2,794,608
AIRPLANE WITH VARIABLE SWEPT WINGS
Filed April 19, 1949                3 Sheets-Sheet 1
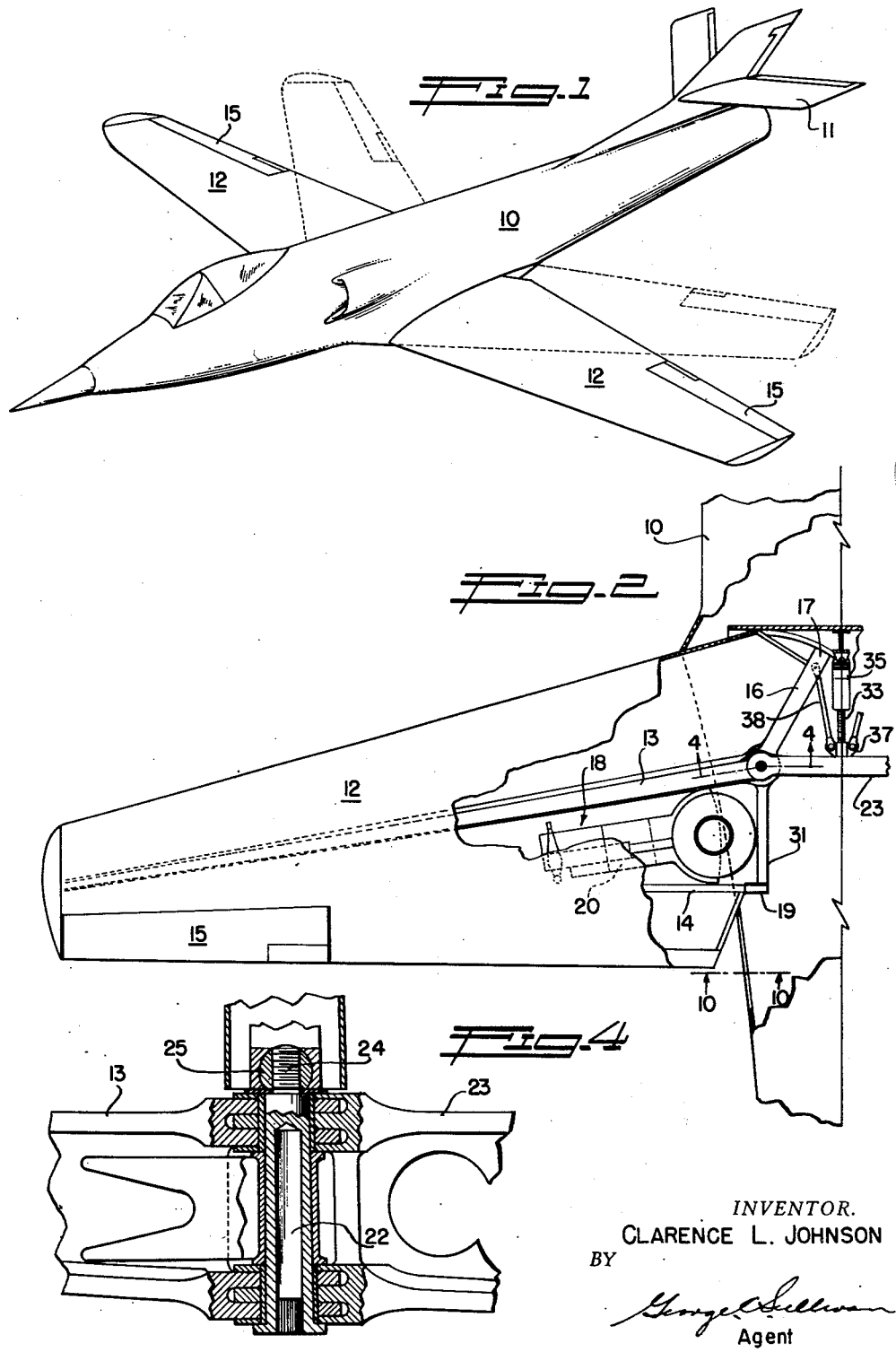
INVENTOR.
CLARENCE L. JOHNSON
BY
George O. Sullivan
Agent

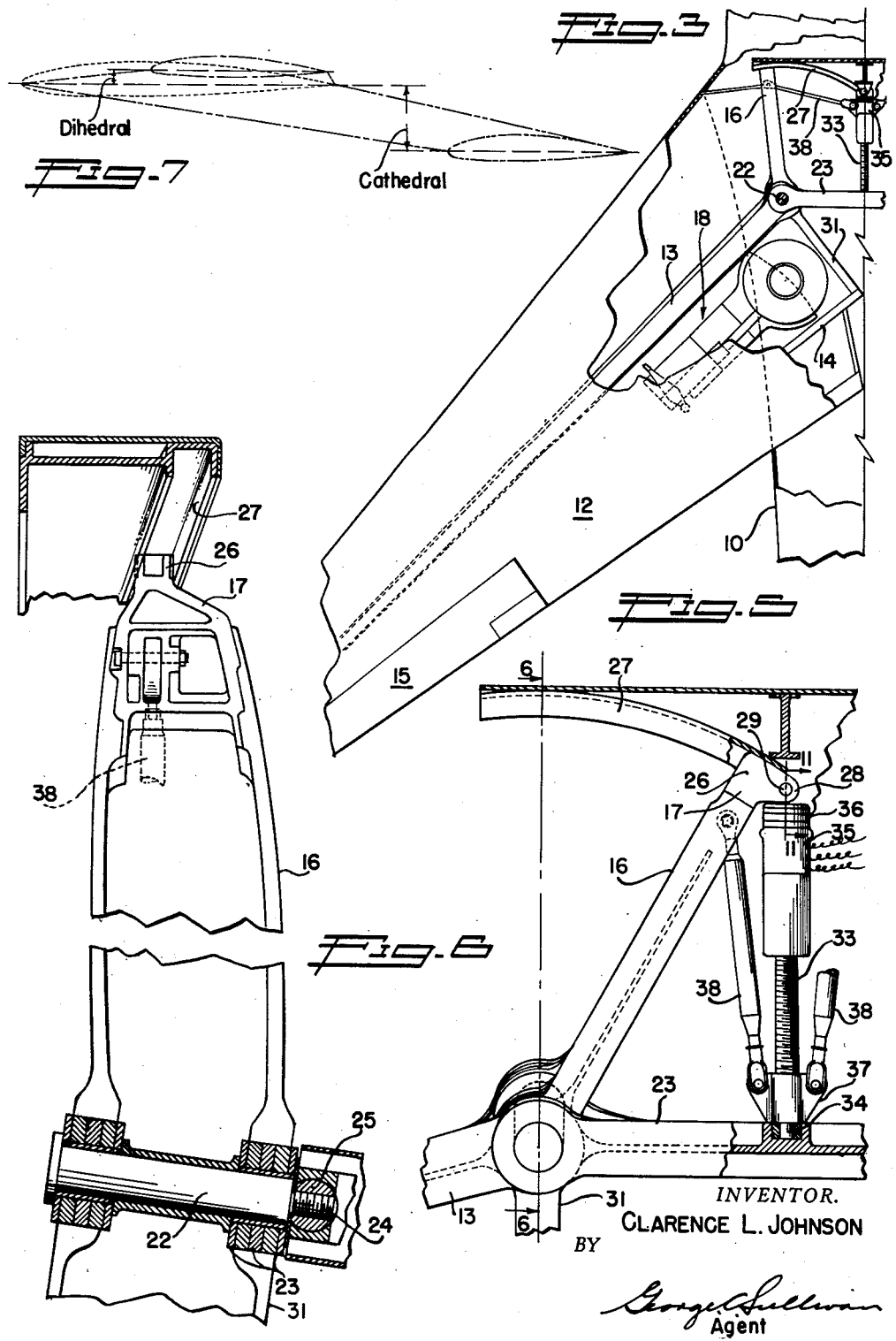

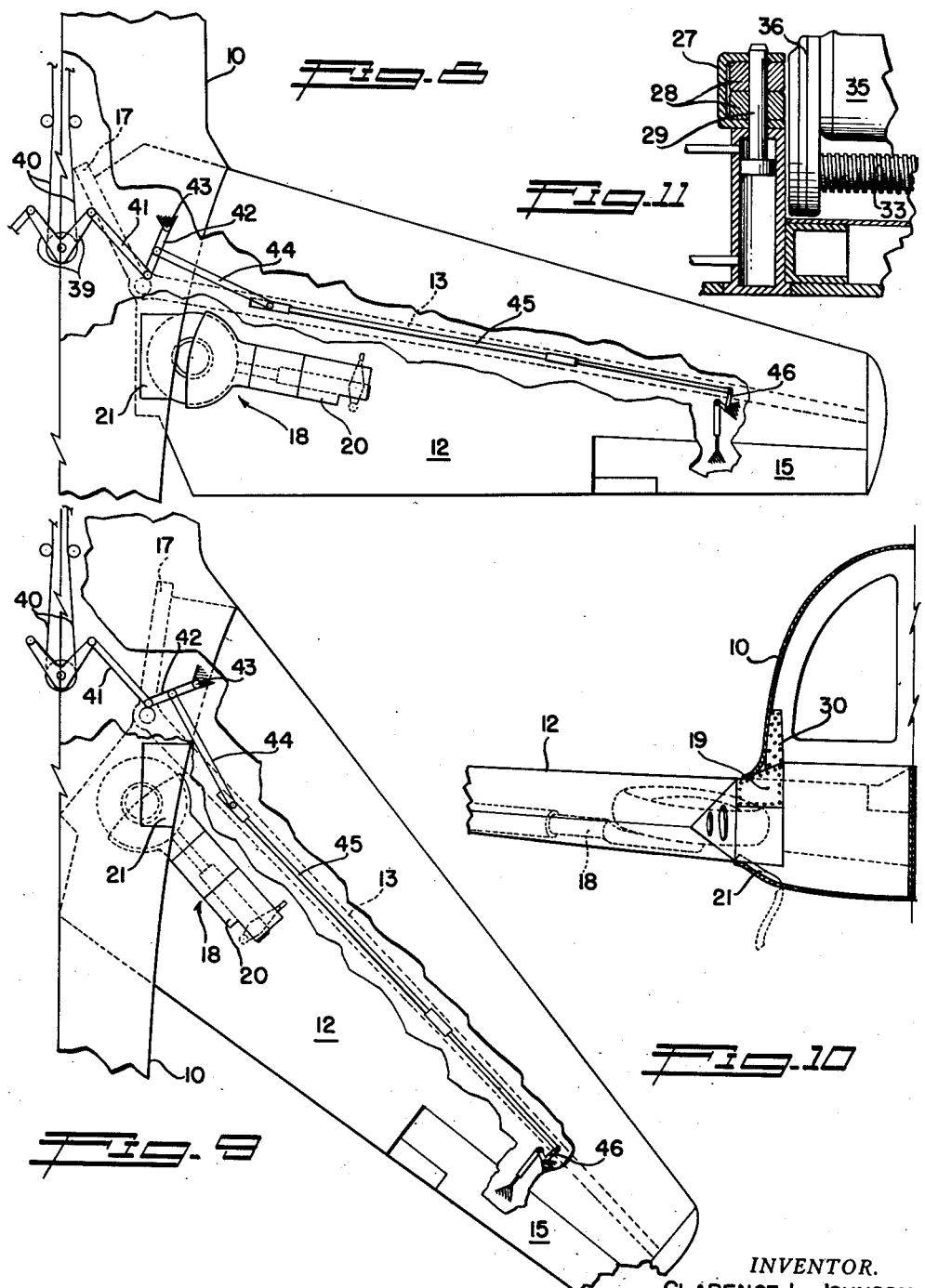

United States Patent Office 2,794,608
Patented June 4, 1957

2,794,608

AIRPLANE WITH VARIABLE SWEPT WINGS

Clarence L. Johnson, Encino, Calif., assignor to Lockheed Aircraft Corporation, Burbank, Calif.

Application April 19, 1949, Serial No. 88,384

3 Claims. (Cl. 244—46)

This invention relates to an improved design for airplanes wherein the wings are adjustable to provide for varying angles of sweep while in flight, in order to obtain the best possible compromise between the conflicting requirements of take-off and climb performance on the one hand and varying degrees of sub- or transonic speed performance and characteristics on the other hand.

It is known that present conventional wing designs, which are substantially without sweep, give better take-off, climb and low speed performance than swept-back wings, and that a high degree of sweep is desirable in the transonic speed range. The problem heretofore has been to get such swept wing designs safely into the air and up to a speed at which the swept design comes into its own; as well as to land such designs at reasonable touchdown speeds. The swept wing design encounters difficulties in stall control and poor maximum lift coefficient during low speed operation; whereas, the essentially straight wing is most efficient under these conditions and encounters extremely serious troubles at sub- and transonic speeds wherein the swept wing is at its best. The incorporation of a variable swept wing so that higher degrees of swept angle could be employed for maximum speed performance, and essentially zero degrees of sweep could be employed during very low speed flight results in greatly improved maneuverability characteristics and permits a large range of maneuvering speeds at high altitudes for substantial maneuvering load factors. Comparative design studies for a given range and perfomance have shown that a fixed swept wing airplane would have to be much larger and provided with approximately twice the power necessary in the present variably swept wing design.

It is accordingly an important object of this invention to provide an improved airplane design wherein the wings are adjustable in flight throughout the range between a substantially zero swept angle and a highly swept angle whereby take-off, low-speed operation and landing may be performed with substantially straight planform wings, whereas as the speed increases the wings can be increasingly swept-back, both to improve wing aerodynamic performance and to provide better maneuverability at any given operating speed. It will be apparent that such variable sweep-wing adjustments introduce center of gravity movement problems. However, the mean aerodynamic chord of the substantially straight wing under its preferred operating conditions differs from that when the wing is swept back, again under its preferred operating conditions. Thus, the extreme forward center of gravity position with the wing forward is partially offset by the means aerodynamic chord position of the wing under such conditions of operation, and the movement of the center of gravity relative to the mean aerodynamic chord of the swept wing is reduced. Further control and restriction of center of gravity travel relative to the resulting means aerodynamic chord is obtainable by suitable disposition of the useful and expendible load and by proper automatic sequencing of fuel withdrawal from various fuel tanks as taught in my copending application Serial Number 600,101, filed June 18, 1945, now Patent No. 2,557,438.

It is a further important object of this invention to compensate for the effect of wing sweep movement on the longitudinal stability of the airplane by varying or reversing the dihedral of the wing between its two extreme positions of swept adjustment. In the low speed or substantially straight wing configuration, a low positive angle of dihedral provides adequate stability; but such a positive dihedral in the high speed swept wing configuration would result in an excessive degree of stability adversely affecting the control and maneuverability of the airplane. Accordingly, I incline the pivotal axis of the wings in such a way as to decrease the dihedral as the wings move toward their swept position, the decrease being such as to produce a substantial negative dihedral or cathedral in the extreme swept position. As is well known, present conventional types of fighters operating at Mach numbers of approximately 0.8 encounter bumps of several "G's" acceleration when operating at high speeds in rough air, due to the excessive stability resulting from such speeds although the stability is deliberately limited to marginal or minimum requirements for low speed operation. By the use of the variable dihedral of the present invention any desired degree of stability can be obtained throughout the operating range of the airplane.

It is also a further important object of this invention to provide a simple and reliable mechanism for varying the sweep angle of an airplane's wings during flight, comprising a single main beam type of wing structure wherein the spar roots are pivoted to a center section main beam in the fuselage; a root rib torsion box structure not only transmitting torsion into the fuselage but providing an operating lever for varying the sweep of the wings; mirror image levers for each wing beam being simultaneously operated by a single electrically operated screw jack which is inherently self-locking in any adjusted position.

It is also a desirable object of this invention to provide a variable swept wing adjustment of the type described wherein landing extension and retraction is restricted to the relatively unswept or forward wing position, and in which the landing gear loads are carried by a torsion box root rib arrangement then supported by the fuselage at the leading and trailing edges thereof.

It is a further object of this invention to provide a simple and reliable aileron operating mechanism operative throughout the range of wing adjustment to provide lateral control under all flight conditions.

Other and further objects of this invention will become apparent as the description of the construction and arrangement of a preferred embodiment of my invention, illustrated in the accompanying drawings, proceeds.

In the drawings:

Figure 1 is a perspective view of a jet type aircraft embodying the features of this invention, the swept wing position being indicated in broken lines;

Figure 2 is a top plan view of one wing in its forward position, the skin being partly broken away to show the general arrangement of the wing pivoting mechanism;

Figure 3 is a view similar to Figure 2 with the wing in its rearward or swept position;

Figure 4 is a detail section of the spar pivot taken on the line 4—4 of Figure 2;

Figure 5 is an enlarged fragmentary detail of the wing operating mechanism in its forward position;

Figure 6 is a section on the line 6—6 of Figure 5 showing the tilted wing pivot, root rib and track;

Figure 7 is an outboard side view of one wing in both extreme positions, showing the change from dihedral to cathedral as the wing moves to its swept position;

Figures 8 and 9 are bottom views of one wing in its forward and rear position, showing the landing gear and doors, with parts of the skin broken away to show the aileron operating mechanism;

Figure 10 is a fragmentary detail of the wing root trailing edge support in the wing forward position corresponding to the line 10—10 in Figure 2; and Figure 11 is a fragmentary enlarged detail of the wing lock mechanism taken on the line 11—11 of Figure 5.

The airplane design chosen for illustrative purposes comprises a fuselage 10 and empennage 11 of a type suitable for high subsonic or transonic maximum speed. The invention itself is primarily concerned with the wing mounting and controls, wherein wings 12 are intended to be adjusted from a forward position of substantially straight or zero sweep and positive dihedral, to a rearward position of relatively high sweep and negative dihedral or cathedral.

It will be understood by those skilled in the art that the straight wing has known characteristics most suitable for take-off, landing and low speed performance; whereas the swept wing is best at high sub- and transonic speeds and is unsuitable for low speeds because of poor maximum lift coefficient, and stall and stability difficulties. Thus the problem boils down to getting a swept wing design into the air and up to the threshold of its efficient operating speed.

In what follows the forward wing position will be referred to as straight or of substantially zero sweep, although, as shown, only the trailing edge is straight and the taper wing design actually introduces an initial moderate degree of sweep based on the 25% chord line of the wing roughly equivalent to the position of a single main spar beam 13 therein.

The main spar beam 13 is of more or less conventional I beam section, so located as to take most of the wing torsion loads in flight and to be assisted by secondary spars 14 for mounting the ailerons 15 and conventional landing flaps (not shown). At the wing root, a heavy nose rib-like structure 16 provides a leading edge lever 17 which is used to control the wing sweep, as will be described later, and an extension 31 thereof forms a torsion box in combination with the spars 13 and 14, this torsion box carrying the loads from a landing gear 18 into the fuselage framing, both at the leading edge lever 17; and at a trailing edge taper fitting 19 shown in Figure 10 and engaged only when the wing is full forward; under which conditions the landing gear may be extended, since the landing gear doors 20 interfere with the fuselage fairing 21 in the swept wing positions, as will be evident from an examination of Figure 9.

The two main wing spar beams 13 are each pivoted at 22 to the ends of a center section beam 23 built into and spanning the fuselage. This beam 23 primarily takes the wing bending loads as most of the torsion and drag is taken by the leading edge levers 17, so that the pivot 22, as shown in Figure 4, may be arranged for ready removal and self-alignment by screwing its upper end 24 into a ball member 25 mounted in a fuselage bulkhead. As best shown in Figure 6 the pivot pin axis is tilted in order to convert the dihedral of the wing in its forward position into a cathedral in its swept position, as further shown in Figure 7.

As best shown in Figures 5 and 6, the ends 26 of leading edge levers 17 slide in arcuate tracks 27 disposed in planes normal to the axes of the pins 22, and carry offset apertured ears 28 which overlap each other in the wing forward position; a hydraulically controlled pin 29 (Figure 11) entering the aligned ear apertures to lock the wings in this position. The straight wing or zero sweep position of the wings is thus reinforced, both to compensate for landing and taxi shocks and the reduced mechanical advantage of the levers 17 in this position. Further support for the wings in this position is provided by the trailing edge taper fitting 19 engaging a fuselage bulkhead ring supported abutment 30 as shown in Figure 10, a heavy root rib 31 in the wings giving a torsion box effect in connection with the wing spars. It will be noted that the trailing edge support abutment 30 is arranged to clear the adjacent wing surface when the wing is moved to its rearward swept position, since the inner corner of the trailing edge moves inwardly into the body of the fuselage, as will be evident from Figures 3 and 9.

A suitable form of wing sweeping mechanism is shown in detail in Figure 5, wherein a screw jack 33 is journaled at one end 34 in the center of the center beam 23 and is driven by a reversible motor 35 at its other end by gearing in a gear box 36 attached to structure joining the arcuate tracks 27. A nut 37 is reciprocated along the jack 33 by rotation thereof in either direction, and in turn transmits motion to the beam levers 17 by links 38. It will be noted from Figure 3 that the geometry of the levers 17 and links 38 provides a very high mechanical advantage when the wing is swept back, the load on the jack being small under such circumstances. In the wing forward position, the locking pin 29 then relieves the jack 33 of the high unsymmetrical nose reactions due to landing loads.

The conventional trailing edge ailerons 15 are arranged to remain operative throughout the range of wing sweep adjustment. This is accomplished by the linkage shown in Figures 8 and 9 wherein a central yoke 39 is operated by cables 40 in the conventional way from the pilot's stick or wheel (not shown). A short link 41 connects each arm of the yoke to a rocking lever 42 pivoted in the wing at 43, the connection between the link and lever being located as closely as physically possible to the wing pivot 22. With the lever pivot 43 moving with the wing, a second link 44 is connected from an intermediate point of the lever 42 to a push-pull rod 45 extending along the main spar and operating a bell crank 46 which in turn operates an aileron link. The anchor or pivot point 43 for the rocking lever 42 may be chosen to favor either the straight or swept wing position, preferably the latter in order to allow the ailerons to droop slightly in the straight wing position.

In the normal operation of the airplane of this invention, taxi, take-off, landing, climbing and low speed operations will be performed with straight or unswept wings wherein the levers 17 are locked in the position of Figure 5 by the pin 29 best shown in Figure 11. Under such conditions, the wing has a high aspect ratio and short mean aerodynamic chord, which are conducive to best aerodynamic performance under climbing and low cruising speed conditions. As speed increases, the wings can be adjusted to increasing angles of sweep until at subsonic or transonic speeds the wings will have reached their extreme swept position, which decreases the aspect ratio, increases the length of the mean aerodynamic chord, and converts the dihedral angle into a negative or cathedral angle, to give superior performance under such conditions. As the wings approach their maximum swept position, the levers 17 and screw jack 33 attain their maximum mechanical advantage, thus relieving the wing hinge pins 22 of most of the torsion and drag load carried by the wing beams.

Having thus described my invention and the present preferred embodiments thereof, I desire to emphasize the fact that many modifications may be resorted to in a manner limited only by a just interpretation of the following claims.

I claim:

1. In an airplane having adjustably swept wings wherein the forward position of said wings is intended for take-off and landing operations, a spar beam type of wing structure, means whereby the wing is pivoted to the airplane about the inner end of the wing spar, the pivot therefor being inclined at such an angle as to change the wing dihedral angle to a cathedral angle as the wing is swept, a root rib structure supported by the airplane at its leading and trailing edges when in the wing forward position to form a torsion box in connection with said wing beam, retractable landing gear carried by said wings, and means preventing extension or retraction of said landing gear except in the forward wing position.

2. In an airplane having adjustably swept wings wherein the forward position of said wings is intended for take-off and landing operations, a spar beam type of wing structure, means whereby the wing is pivoted about an inclined axis in the airplane at the inner end of the wing spar beam whereby to vary the dihedral angle of the wing as the latter is swept, a root rib structure supported by the airplane at its leading and trailing edges when in the wing forward position to form a torsion box in connection with said wing beam, retractable landing gear carried by said wings, retractable lock means engaging said root ribs when in the forward wing position, and means preventing extension or retractions of said landing gear except in the forward wing position.

3. In an airplane, swept wings comprising spar beam wing panels, a center section beam extending through the airplane, pivots connecting each wing spar to the center section beam, said pivots being so inclined as to reduce the wing dihedral as the wings are moved to the swept position, a root rib structure at the inboard end of each wing panel said root rib forming an operating lever for adjusting the swept position of the wing panels, a guiding track for the forward end of the operating lever, and a reversible motor driven self locking screw jack actuator linked to both of said operating levers whereby to simultaneously and equally adjust both wing panels throughout the range of sweep provided by the guiding track for said operating levers.

References Cited in the file of this patent

UNITED STATES PATENTS

| | | |
|---|---|---|
| 1,740,016 | Hubschman | Dec. 17, 1929 |
| 1,868,417 | Hill | July 19, 1932 |
| 2,011,254 | Nightingale | Aug. 13, 1935 |
| 2,271,509 | Rouanet et al. | Jan. 27, 1942 |
| 2,293,644 | Gluhareff | Aug. 18, 1942 |
| 2,494,208 | Schultz | Jan. 10, 1950 |

FOREIGN PATENTS

| | | |
|---|---|---|
| 578,623 | Great Britain | July 5, 1946 |
| 923,988 | France | Mar. 3, 1947 |